United States Patent
Anand

(10) Patent No.: US 11,876,928 B2
(45) Date of Patent: Jan. 16, 2024

(54) FRAUD DETECTION SYSTEM

(71) Applicant: Resilient PLC, London (GB)

(72) Inventor: Abhinav Anand, London (GB)

(73) Assignee: Resilient PLC, London (GB)

( * ) Notice: Subject to any disclaimer, the term of this patent is extended or adjusted under 35 U.S.C. 154(b) by 235 days.

(21) Appl. No.: 17/419,177

(22) PCT Filed: Dec. 20, 2019

(86) PCT No.: PCT/GB2019/053642
§ 371 (c)(1),
(2) Date: Jun. 28, 2021

(87) PCT Pub. No.: WO2020/136367
PCT Pub. Date: Jul. 2, 2020

(65) Prior Publication Data
US 2022/0182490 A1 Jun. 9, 2022

(30) Foreign Application Priority Data

Dec. 28, 2018 (GB) .................................. 1821282.9

(51) Int. Cl.
*H04M 3/00* (2006.01)
*H04M 5/00* (2006.01)
(Continued)

(52) U.S. Cl.
CPC ....... *H04M 3/436* (2013.01); *H04M 3/42059* (2013.01); *H04M 2203/6027* (2013.01)

(58) Field of Classification Search
CPC .................. H04M 3/436; H04M 15/47; H04M 2203/6027; H04M 1/663; H04M 3/42059; H04M 2215/0148; H04M 3/2281; H04M 3/2218; H04M 15/41; H04M 7/0078; H04M 2215/0164; H04M 3/42068; H04M 2215/0188; H04M 3/42357; H04M 15/755; H04M 3/02; H04M 2203/555; H04M 15/80; H04M 2215/62; H04M 15/43;
(Continued)

(56) References Cited

U.S. PATENT DOCUMENTS 6,163,604 A * 12/2000 Baulier ............... H04W 12/126
379/189
6,516,056 B1 * 2/2003 Justice ............... G06Q 20/4016
379/114.15
(Continued)

FOREIGN PATENT DOCUMENTS

CN 108924333 A 11/2018
WO 2006/130803 A1 12/2006
WO 2016/105891 A1 6/2016

OTHER PUBLICATIONS

Examination Report for British Patent Application No. 1821282.9 (dated Feb. 15, 2023).
(Continued)

*Primary Examiner* — Kharye Pope
(74) *Attorney, Agent, or Firm* — Merchant & Gould P.C.

(57) ABSTRACT

A fraud detection system receives incoming calls and determines a fraud score indicating the likelihood that the incoming call is from a fraudulent or malicious caller. The system is able to determine the age of a telephone number of an incoming call and from it determine a fraud score for the call.

8 Claims, 4 Drawing Sheets

(51) Int. Cl.
*H04L 12/66* (2006.01)
*H04M 3/436* (2006.01)
*H04M 3/42* (2006.01)

(58) Field of Classification Search
CPC ....... H04M 15/44; H04M 15/77; H04L 12/14; H04L 67/306; H04W 4/24; H04W 12/12
USPC ......... 379/126, 133, 112.01, 114.01, 114.03, 379/121.02, 121.04, 121.05; 455/405, 455/406, 410, 411, 551; 370/352, 401, 370/241
See application file for complete search history.

(56) References Cited

U.S. PATENT DOCUMENTS

| | | | |
|---|---|---|---|
| 7,433,455 | B1 | 10/2008 | Oran |
| 7,912,192 | B2 | 3/2011 | Kealy et al. |
| 8,238,532 | B1* | 8/2012 | Cox .................. H04M 15/47 379/144.03 |
| 8,275,110 | B2 | 9/2012 | Vendrow |
| 8,443,049 | B1 | 5/2013 | Geddes |
| 8,781,093 | B1 | 7/2014 | Rybak et al. |
| 9,264,536 | B1 | 2/2016 | Saitawdekar et al. |
| 9,762,728 | B1 | 9/2017 | Cox et al. |
| 10,320,841 | B1 | 6/2019 | Allen |
| 10,380,692 | B1* | 8/2019 | Parker .................... G06Q 40/08 |
| 11,272,063 | B1 | 3/2022 | Kliebhan et al. |
| 2002/0137490 | A1 | 9/2002 | Gallant |
| 2004/0192297 | A1* | 9/2004 | Erskine ............... H04M 15/772 455/445 |
| 2005/0032527 | A1* | 2/2005 | Sheha ................. H04M 1/2746 455/457 |
| 2005/0129206 | A1 | 6/2005 | Martin |
| 2005/0152527 | A1 | 7/2005 | Kent, Jr. et al. |
| 2006/0177030 | A1 | 8/2006 | Rajagopalan et al. |
| 2007/0036314 | A1 | 2/2007 | Kloberdans et al. |
| 2007/0271339 | A1 | 11/2007 | Katz |
| 2008/0043968 | A1 | 2/2008 | Jain et al. |
| 2008/0084975 | A1 | 4/2008 | Schwartz |
| 2008/0123823 | A1 | 5/2008 | Pirzada et al. |
| 2008/0175226 | A1 | 7/2008 | Alperovitch et al. |
| 2008/0227471 | A1* | 9/2008 | Dankar .............. G06Q 20/3224 455/456.6 |
| 2009/0086947 | A1 | 4/2009 | Vendrow |
| 2010/0166166 | A1 | 7/2010 | Smith et al. |
| 2010/0246570 | A1 | 9/2010 | Chavez et al. |
| 2010/0303211 | A1 | 12/2010 | Hartig et al. |
| 2011/0176666 | A1 | 7/2011 | Reding et al. |
| 2012/0307993 | A1 | 12/2012 | Masters |
| 2013/0216027 | A1 | 8/2013 | Rados et al. |
| 2013/0223605 | A1 | 8/2013 | Statham et al. |
| 2014/0045456 | A1 | 2/2014 | Ballai et al. |
| 2014/0105373 | A1 | 4/2014 | Sharpe |
| 2014/0286484 | A1 | 9/2014 | Ehrlich et al. |
| 2015/0026786 | A1 | 1/2015 | Alexander |
| 2015/0067842 | A1 | 3/2015 | Stibel |
| 2015/0087280 | A1 | 3/2015 | Ferrand et al. |
| 2015/0271327 | A1 | 9/2015 | Dow et al. |
| 2015/0350399 | A1 | 12/2015 | Feller |
| 2016/0116368 | A1* | 4/2016 | Cornelius ............... G06F 11/00 702/34 |
| 2016/0127536 | A1* | 5/2016 | Jayapalan ........... H04L 63/1408 379/265.02 |
| 2016/0309024 | A1 | 10/2016 | Quilici et al. |
| 2016/0330319 | A1 | 11/2016 | Ferrand et al. |
| 2016/0360036 | A1 | 12/2016 | Ansari |
| 2017/0026974 | A1 | 1/2017 | Dey et al. |
| 2017/0238199 | A1* | 8/2017 | Ponnuswamy ........... G06F 8/65 370/252 |
| 2017/0255948 | A1 | 9/2017 | Hale |
| 2018/0048759 | A1 | 2/2018 | Sharpe |
| 2018/0270318 | A1 | 9/2018 | Wong et al. |
| 2018/0295140 | A1 | 10/2018 | Lu et al. |
| 2018/0324297 | A1 | 11/2018 | Kent et al. |
| 2018/0324299 | A1 | 11/2018 | Sial et al. |
| 2019/0141183 | A1* | 5/2019 | Chandrasekaran ...... G06N 5/01 |

OTHER PUBLICATIONS

Invitation to Respond to Written Opinion, issued in Singaporean Patent Application No. 11201911788W (dated Jul. 16, 2021).
International Search Report and Written Opinion for PCT/GB2018/051847 (dated Oct. 8, 2018).
Search Report for British Patent Application No. 1710571.9, dated Oct. 31, 2017.
Anonymous: "How old is your 06 number?—NieuweMobiel.NL" (2018)—retrieved from the Internet: www.nieuwemobiel.nl/075839/11450/How-oud-jouw-06-nummer.html, with English Abstract.
International Search Report and Written Opinion for PCT/GB2019/053642 (dated Jun. 10, 2020).
Search Report for British Patent Application No. 1821282.9 (dated Jun. 19, 2019).
Written Opinion issued in Singaporean Application No. 11201911788W (dated May 5, 2023).

* cited by examiner

FRAUD DETECTION SYSTEM

This application is a National Stage Application of PCT/GB2019/053642, filed Dec. 28, 2019, which claims the benefit of British Patent Application No. 1821282.9, filed Dec. 28, 2018, and which applications are incorporated herein by reference. To the extent appropriate, a claim of priority is made to each of the above-disclosed applications.

BACKGROUND OF THE INVENTION

The invention has particular although not exclusive relevance to systems and methods for identifying fraudulent callers within a telecommunications system.

Many corporate entities provide a "call centre" to provide an interface to their customers, including banks, utility companies, insurance companies, etc. Many of these call centres use various automated technologies to handle incoming calls, such as interactive voice response (IVR) technology and automated attendants as well as human operator interactions with the calling customers.

However, it is unfortunately becoming increasing prevalent that malicious individuals and/or computer programs are fraudulently attempting to impersonate customers in order to obtain private information about the customers or to obtain financial gain in some way. These fraudsters are becoming increasingly sophisticated and can be extremely harmful to companies, both financially and reputationally. Unfortunately, it is difficult to detect such fraudulent activity because the fraudsters can "spoof" the customer's identity by changing the "caller line identity" (CLI) associated with their phone to that of the customer. Within the context of, for example, UK telecommunications networks, this is easily achieved by spoofing the Presentation Number and in more advanced attacks, the Network Number.

Existing systems that try to detect these fraudsters rely on question/response strategies to interrogate the calling party in order to verify their true identity or by using voice identification technology to identify the calling party. However, these systems require considerable resources at the call centre—either in terms of the need for a human operator, or a sophisticated computer system, and can easily be overloaded by a sophisticated "Denial of Service" (DoS) attack.

There is therefore an urgent need for a fraud detection system that can automatically detect the likelihood of a fraudulent caller without the need for significant resources at the call centre.

SUMMARY OF THE INVENTION

In one embodiment, the call switching unit is configured to forward the incoming call to one of a number of different destinations based on the fraud score determined by the fraud scoring unit or the incoming call has a plurality of associated destinations and the call switching unit is configured to select one of the associated destinations based on the determined fraud score.

The fraud detection system may further comprise a call signalling information extraction unit that processes the extracted call signalling information to determine one or more call trust factors for the incoming call and wherein the fraud scoring unit is configured to determine the fraud score for the incoming call using the determined call trust factors for the incoming call. In this case the call signalling information extraction unit may determine whether or not the calling party is hiding a presentation CLI, P-CLI. The call signalling information extraction unit may also determine whether or not the signalling information of the incoming call comprises a network CLI, N-CLI. In some embodiments, the call signalling information extraction unit is configured to determine whether or not a geographic origin of the call is the same as a geographic origin of the destination to which the call is forwarded by the call switching unit. The call signalling information may also comprise multiple data items each depending on an indicated geographic origin and the call information extraction unit compares the geographic origins indicated by the multiple data items to identify any discrepancies there between. In this case, the fraud scoring unit determines a higher fraud score for the incoming call if there are any such discrepancies.

An analysis unit may be provided to analyse historical call information to determine trend information and in this case the fraud scoring unit determines the fraud score for the incoming call using the trend information.

In one embodiment, the call switching unit associates an identifier with the incoming call and forwards the incoming call to the destination associated with the incoming call together with the determined fraud score and the associated identifier.

The fraud detection system may comprise a call outcomes database including data for historical calls indicating whether or not the historical calls were fraudulent. In this case, the call signalling information identifies a caller or a group of callers having a common geographic origin.

Optionally or instead, the fraud scoring unit may comprise one or more of: an expert system, a neural network and a fuzzy logic system.

In another embodiment, the fraud score is forwarded to the associated destination using any one of: performing a GET request for the fraud score using an Application Program Interface, API; injecting the fraud score into the extracted call signalling data in a predetermined format and parameter; and injecting the fraud score as a spoken call whisper to the called party when the call is answered.

The fraud score detection system may forward the fraud score separately from the call. Optionally or instead, the fraud score is forwarded in response to a request from a remote server. The fraud score detection system may forward the call to a first destination associated with the call and forward the fraud score to a second destination associated with the call.

A network operator server may comprise the fraud detection system.

In one embodiment, a fraud detection system comprises: means for receiving an incoming call; means for processing the incoming call to extract call signalling information associated with the incoming call, including a phone number of the calling party; means for determining an age of the phone number of the calling party; and means for determining a fraud score associated with the incoming call using the determined age of the phone number, the fraud score indicating the likelihood that the incoming call is from a fraudulent caller.

In one embodiment, a fraud detection method comprises: receiving an incoming call; processing the incoming call to extract call signalling information associated with the incoming call including a phone number of the calling party; determining an age of the phone number of the calling party; and determining a fraud score associated with the incoming call using the determined age, the fraud score indicating a likelihood that the incoming call is from a fraudulent caller.

In another embodiment, a fraud detection system comprises: a call switching unit for receiving an incoming call;

a call information extraction unit for processing the incoming call to extract call signalling information associated with the incoming call; and a fraud scoring unit for determining a fraud score associated with the incoming call using the extracted call signalling information, the fraud score indicating a likelihood that the incoming call is from a fraudulent caller; wherein the call switching unit is configured to forward the incoming call to one of a number of different destinations based on the fraud score determined by the fraud scoring unit.

In one embodiment, a fraud detection system comprises: a call switching unit for receiving an incoming call; a call information extraction unit for processing the incoming call to extract call signalling information associated with the incoming call; and a fraud scoring unit for determining a fraud score associated with the incoming call using the extracted call signalling information, the fraud score indicating a likelihood that the incoming call is from a fraudulent caller; wherein the call switching unit is configured to forward the incoming call to one of a number of different destinations based on the fraud score determined by the fraud scoring unit.

Another embodiment provides a method of estimating the age of a telephone number, the method comprising: receiving a telephone number at a current time; identifying a block of telephone numbers that was allocated to a communications provider at a previous time and that includes the received telephone number; determining an allocation to activation pattern representative of the time taken for the communications provider to activate telephone numbers after a block of telephone numbers has been allocated to the communications provider; and estimating an age of the received telephone number from the determined allocation to activation pattern, said current time and said previous time.

In one embodiment, a method of estimating the age of a telephone number is provided, the method comprising: receiving a telephone number at a current time; identifying a block of telephone numbers that was allocated to a communications provider at a previous time and that includes the received telephone number; determining an activation time for the identified block of telephone numbers; and estimating an age of the received telephone number from the determined activation time and said current time.

Optionally or instead, the fraud detection method may further comprise processing the extracted call signalling information to determine one or more call trust factors for the incoming call and determining the fraud score for the incoming call using the determined call trust factors for the incoming call. In this case, the fraud detection method may further comprise determining whether or not the calling party is hiding a presentation CLI, P-CLI.

The fraud detection method may further comprise determining whether or not the signalling information of the incoming call comprises a network CLI, N-CLI.

The fraud detection method may further comprising determining whether or not a geographic origin of the call is the same as a geographic origin of the destination to which the call is forwarded by the call switching unit.

In another embodiment, when the call signalling information comprises multiple data items each depending on an indicated geographic origin, the fraud method may further comprise comparing the geographic origins indicated by the multiple data items to identify any discrepancies therebetween. In this case, the method may further comprise determining a higher fraud score for the incoming call if there are any discrepancies between the geographic origins indicated by the multiple data items.

Optionally or instead, the fraud detection method may further comprise analysing historical call information to determine trend information and determining the fraud score for the incoming call using the trend information.

The fraud detection method may further comprise associating an identifier with the incoming call and forwarding the incoming call to the destination associated with the incoming call together with the determined fraud score and the associated identifier.

The fraud detection method may comprise a call outcomes database including data for historical calls indicating whether or not the historical calls were fraudulent. In this case, the call origin signalling information may identify a caller or a group of callers having a common geographic origin.

Optionally or instead, the fraud scoring unit of the fraud detection method, may comprise one or more of: an expert system, a neural network and a fuzzy logic system.

In one embodiment a fraud detection system is provided for detecting fraudulent calls to a call centre system, the fraud detection system comprising: a call switching unit for receiving a current incoming call; a call information extraction unit for processing the current incoming call to extract call signalling information associated with the incoming call; a database comprising a plurality of data entries, each data entry associated with a previous incoming call and comprising call signalling information extracted from the associated previous incoming call and a unique identifier provided by the call centre system when the incoming call is determined to be from a genuine caller; an analysis unit for comparing the extracted call signalling information of the current incoming call with the call signalling information stored in the plurality of data entries of the database; wherein if the analysis unit identifies a match between the extracted call signalling information for the current incoming call and the call signalling information of a data entry, the call switching unit is configured to forward the incoming call to the call centre system via a telecommunications network together with the unique identifier associated with the matching data entry.

Preferably, the fraud detection system may also be configured to, if the analysis unit determines there is not a match between the extracted call signalling information for the current incoming call and the call signalling information stored in the database, determine a fraud score associated with the current incoming call using the extracted call signalling information for the current incoming call, the fraud score indicating a likelihood that the incoming call is from a fraudulent caller; and wherein the call switching unit is configured to forward the incoming call to one of a number of different destinations based on the fraud score determined by the fraud scoring unit.

Aspects of the invention extend to computer program products such as computer readable storage media having instructions stored thereon which are operable to program a programmable processor to carry out a method as described in the aspects and possibilities set out above or recited in the claims and/or to program a suitably adapted computer to provide the apparatus recited in any of the claims.

Each feature disclosed in this specification (which term includes the claims) and/or shown in the drawings may be incorporated in the invention independently (or in combination with) any other disclosed and/or illustrated features. In particular but without limitation the features of any of the claims dependent from a particular independent claim may be introduced into that independent claim in any combination or individually.

BRIEF DESCRIPTION OF THE DRAWINGS

Embodiments of the invention will now be described by way of example only with reference to the attached figures in which.

DETAILED DESCRIPTION OF THE PREFERRED EMBODIMENTS

Figure 1:
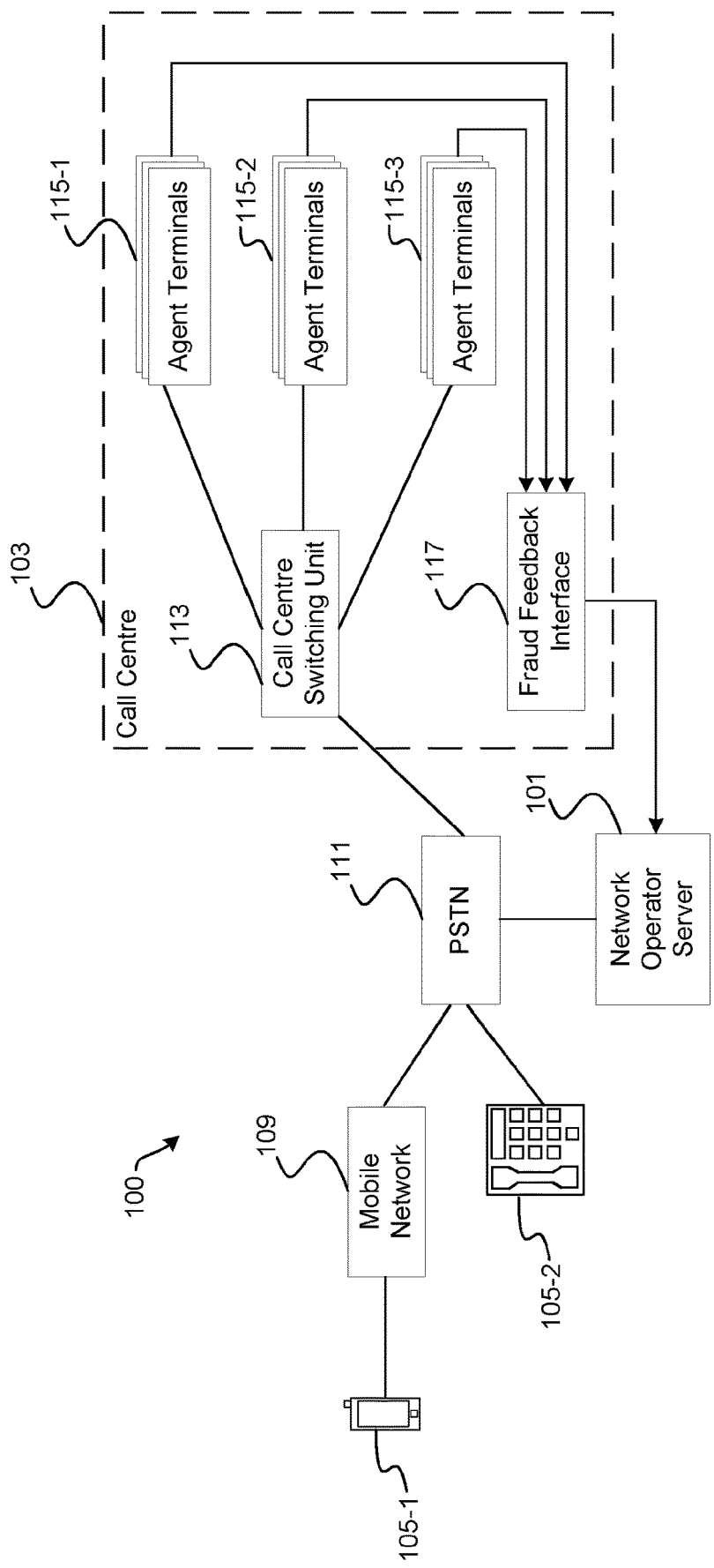
FIG. 1 schematically illustrates an overview of a telecommunications system.

FIG. 1 provides an overview of a telecommunications system 100 having a network operator server 101 that provides fraud detection services to its commercial subscribers—such as the call centre 103. As shown, the telecommunications system 100 includes a number of user telephones—which may be mobile (cellular/wireless) telephones 105-1 or landline telephones/computer terminals 105-2. The mobile telephones 105-1 typically connect to other parties via a mobile network 109 and the Public Switched Telephone Network (PSTN) 111. Landline telephones and computer terminals 105-2 connect directly to the PSTN 111.

Calls made to subscribers of the network operator that owns the network operator server 101 are routed by the PSTN 111 to the network operator server 101. The calls include various network signalling data including CLI data that identifies the telephone number of the party making the call. There are three calling party identifications associated with a call in UK PSTN networks—a fixed network originated CLI called the Network Number or the Network CLI (N-CLI) and two Presentation Numbers or Presentation CLIs (P-CLI) that can be set by the calling party and that are provided to the call receiving party. One of these presentation numbers is set by international telecommunications networks and may be received in a field called "Generic Number"; and, the UK telecommunications network may supplement this presentation number, as defined by NICC (a UK telecommunications standardisation body) with a UK specific field called "Presentation Number". The difference between these presentation numbers is that the "Presentation Number" field allows for numbers to be marked as screened, whereas "Generic Number" is assumed to never be screened and cannot be marked as screened. Additional markings (privacy marking, authenticity marking and integrity marking) are provided for each CLI to ensure privacy, authenticity and integrity of the CLIs—such as those illustrated in the tables below. It should be noted that there is an implicit relationship between integrity marking and CLI digits. Integrity is a principle which is followed by regulated telecommunications network operators (often referred to as Communication Providers or CPs). When integrity cannot be verified by operators, for example, on their interconnecting interfaces with other national or international operators, it may result in the CLI digits being removed/made unavailable; it may also involve the Authenticity marker being changed.

| Ofcom regulated concept | UK Signalling Concepts | SS7 UK Markings | | |
|---|---|---|---|---|
| | | CLI Digits | Authenticity | Privacy |
| Network Number | | Address signals | Screening indicator | Presentation Indicator |
| | Calling Party Number | "Correct" "Incorrect" "Missing" | "User provided, verified & passed" "Network provided" | "Presentation allowed" "Presentation restricted" "Address not available" "Presentation restricted by network" |
| | CLI Blocking Indicator (UK only) | — | — | "Network Number may not be disclosed to the called user" "Network Number may (subject to other parameters) be disclosed to the called user" |
| Presentation Number | | | | |
| | Generic Number | "Correct" "Incorrect" "Missing" | "User provided, not verified" | "Presentation allowed" "Presentation restricted" |
| | Presentation Number (UK only) | "Correct" "Incorrect" "Missing" | "User provided, not verified" "User provided, verified & passed" "Network provided" | "Presentation allowed" "Presentation restricted" |

-continued

| Ofcom regulated concept | UK Signalling Concepts | SIP UK Markings | | |
|---|---|---|---|---|
| | | CLI Digits | Authenticity | Privacy |
| Network Number | | Address-specification (addr-spec) | Implicit | Privacy header |
| | "P-Asserted-identity" | "Correct" "Incorrect" "Missing" "Unavailable" | "Field included" "Field not included" | "id" "Field not included" |
| Presentation Number | | — | — | — |
| | "From" | "Correct" "Incorrect" "Missing" "Unavailable" "Anonymous" | "(Use Digits)" | "(Use Digits)" |

Although these markings give a great degree of insight into the authenticity and integrity of the CLI, these are usually lost in protocol translation when the information is transferred to "enterprise" systems. Additionally, the privacy markings might restrict the availability of the CLIs to the end user and their systems due to regulator guidelines. The P-CLI can be set to be the same as the network CLI, or it can be left blank, or it can be set as a different telephone number. There are various legitimate telecommunication services that rely on the P-CLI—such as services that provide a common switchboard number for all outgoing calls from an enterprise, second number services, etc. As the call is routed through the telecommunications network, the N-CLI is removed from the call so that the calling party's identity can be kept hidden if desired by the user and dictated by the privacy markings. However, fraudsters take advantage of the P-CLI to "spoof" the identity of other users in an attempt to fool call recipients into believing that the malicious party is in fact someone that they are not. Although CLI digits can be spoofed in the three CLIs by fraudulent operators, locally or internationally, the UK PSTN network entry points and regulated operators ensure that the authenticity marker (Screening Indicator) is set accurately to indicate the trustworthiness of the CLI digits in each of these CLIs. The authenticity marker is again usually not transferred to the end user or enterprise systems and in a number of scenarios may be lost during protocol translation. These parameters and principles are represented in both SS7 based network and in the UK SIP based networks.

With the present invention, calls received at the network operator server 101 are processed to determine, in real time, a fraud score that indicates the likelihood that the call is originating from a fraudster. As will be described in more detail below, this fraud score is determined using the three CLIs, the markings against the CLIs and other call parameters, call trends and historical data. Based on this fraud score, the incoming call is ultimately routed to a specific operator terminal or group of operator terminals of the call centre 103. As shown in FIG. 1, the call centre 103 has a call centre switching unit 113 and, in this example, three groups of agent terminals 115-1, 115-2 and 115-3. The agent terminals 115-1 are dedicated to handling normal calls that are unlikely to be fraudulent (and so may be based on an automated system); the agent terminals 115-2 are dedicated to handling calls that might be fraudulent and may be operated by a human agent; and agent terminals 115-3 are dedicated to handling calls that have a high likelihood of being fraudulent and are typically operated by more experienced human operators. Thus calls that the network operator server 101 determine have a low fraud score (and thus a low likelihood of being fraudulent) will be routed to the agent terminals 115-1; calls that the network operator server 101 determine have a medium fraud score (and thus a medium likelihood of being fraudulent) will be routed to the agent terminals 115-2; and calls that the network operator server 101 determine have a high fraud score (and thus a high likelihood of being fraudulent) will be routed to the agent terminals 115-3.

In this embodiment, the call centre 103 provides feedback to the network operator server 101 via a feedback interface 117 (which may simply be a computer interface through a computer network such as the Internet) based on the outcomes of the call with the relevant agent terminals 115. This feedback information may simply confirm that a call was or was not fraudulent. The network operator server 101 uses this feedback information to increase its historical knowledge that it will use to determine fraud scores for subsequent incoming calls.

An overview of the fraud detection system has been given above. A more detailed description will now be given of the network operator server 101 and of the call centre 103 in order to give a fuller understanding of the system.

Network Operator Server

Information Extraction Unit

Figure 2:
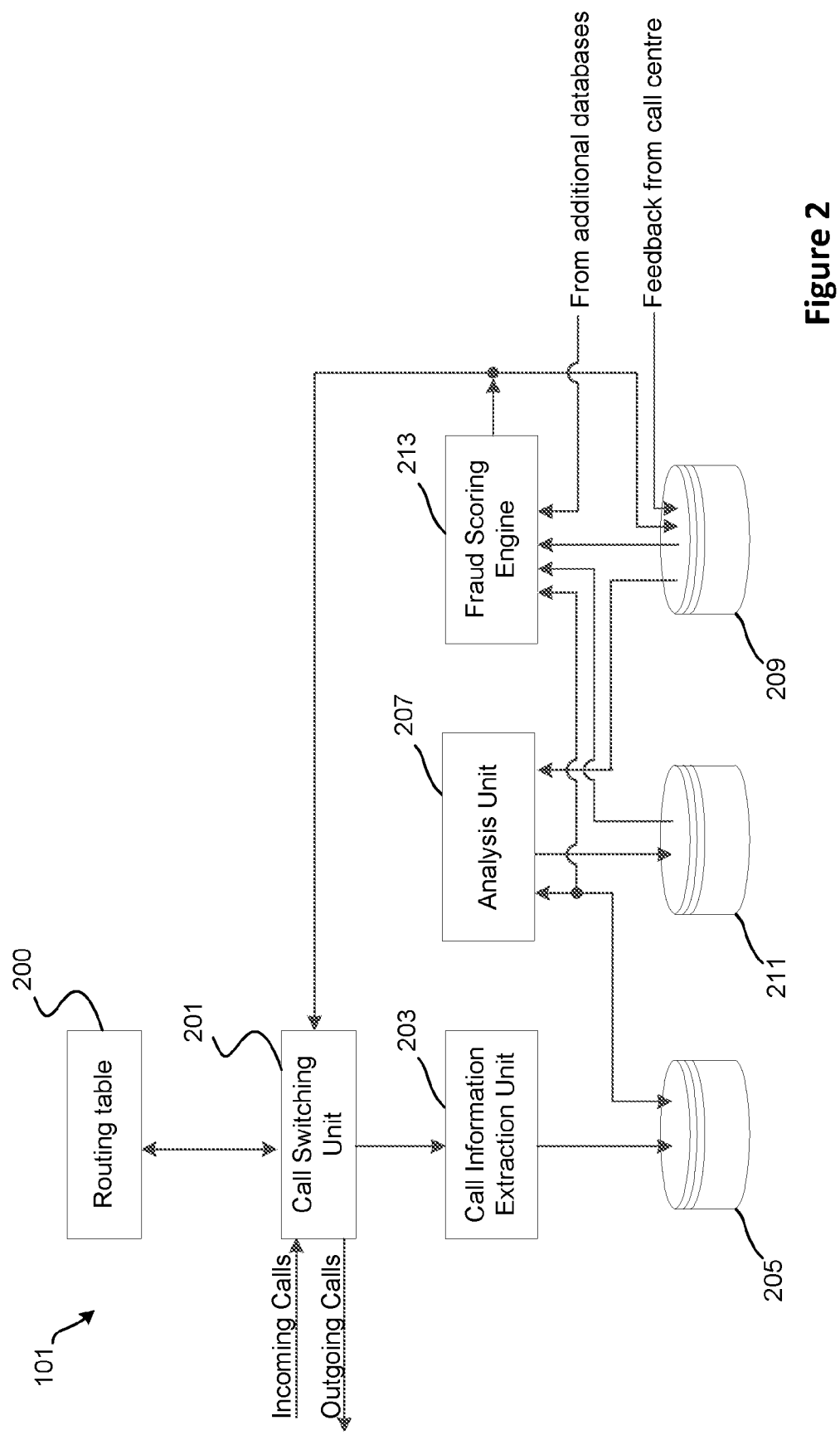
FIG. 2 schematically illustrates a network operator server forming part of the system shown in FIG. 1.

FIG. 2 illustrates the main components of the network operator server 101. As shown in FIG. 2, incoming calls are received at a call switching unit 201 which associates a unique identifier with the incoming call. A more detailed description of the call switching unit 201 will be given below. The call switching unit 201 passes the incoming call to a call information extraction unit 203 which extracts call signalling information from the incoming call. Various signalling information may be extracted, for example call origin parameters such as:

N-CLI;
P-CLI;
Routing information, such as SS7 Originating Point Code (SS7 OPC), Session initiation protocol (SIP) headers; and
Call geographic origin parameter.

There are several parameters/fields associated with the origin of a call being carried over a PSTN. For example, a calling line identifier (CLI), sometimes referred to as a caller line identity, identifies the number of the calling party, e.g. a 15 digit MSISDN, commonly referred to as Mobile Station International Subscriber Directory Number. A MSISDN is a number that uniquely identifies a subscriber in a GSM or a UMTS network, and may be displayed as a caller line identity. A mobile country code (MCC), as defined by the International Telecommunications Union (ITU), is made up of one to three digits. Digits one to three of the MSISDN are reserved for the mobile country code. Accordingly, it is straightforward to determine the geographic origin of a call where the MSISDN is displayed, by analysis of the first three digits of that MSISDN. However, it is possible for a fraudulent user to spoof their CLI to indicate a country where they are not located. The actual country of origin can be checked by sending a "MAP-SEND-ROUTING-INFO-FOR-SM" message, as described in 3GPP TS 29.002 to the mobile network. The "MAP-SEND-ROUTING-INFO-FOR-SM" message is used to interrogate the global title of a Mobile Switching Centre (MSC) to which a user of a mobile telephone is connected—as this is indicative of the country where the mobile telephone is located. Therefore, if a user has spoofed their CLI to indicate a country where they are not located, comparison of the CLI to the returned result of the "MAP-SEND-ROUTING-INFO-FOR-SM" message would reveal whether or not the user is behaving fraudulently.

Similarly to an MSISDN, part of an International Mobile Subscriber Identity (IMSI) may be presented as a CLI and as in the case of the MSISDN, the MCC may be made up of one to three digits and presented in digits one to three of the IMSI, potentially making identification of the geographic origin of the call similarly straightforward.

The call information extraction unit 203 analyses the extracted call origin parameters to determine a set of trust factors for the call. These trust factors can include one or more of the following:

"Is withheld"—which refers to instances where the calling party is hiding their CLI, potentially because they are a fraudster. Here the call information extraction unit 203 processes the incoming call signalling data to extract the P-CLI (digits and privacy marker), the N-CLI (digits and privacy markers). Within SS7, these parameters are received within the Calling Party Number, the Generic Number, the UK Presentation Number and the CLI Blocking Indicator parameters. Within SIP, these are received in the From header, the P-Asserted-Identity header and the Privacy header. A combination of this information is used to determine a value of the trust factor, which may be represented as a weighted fraction value.

"Is screened"—which refers to instances where a UK network operator has determined that the CLI's authenticity can or cannot be ascertained. Here the call information extraction unit 203 processes the incoming call signalling data to extract the P-CLI (authenticity markers), the N-CLI (authenticity markers). Within SW, this is received within the Calling Party Number, the Generic Number and the UK Presentation Number. Within SIP, these are based on the presence of the P-Asserted-Identity. A combination of this information is used to determine a value of the trust factor, which may be represented as a weighted fraction value.

"UK specific SS7 protocol messages"—such as Integrated Services Digital Network (ISDN) User Part UK (often termed ISUP UK) messages, which may, for example, be indicative of the call being of UK origin. All calls originating in the UK have unique UK specific parameters within their associated call signalling. These are specified and agreed by the UK interconnection forums (NICC) among the operators and adhered to by all legitimate operators. Here the call information extraction unit 203 processes the incoming call signalling data to determine the presence of UK specific parameters. The presence or absence of the UK specific parameters is represented as a weighted fraction value and affects the trust factor. As an example, a call with a UK N-CLI, but missing UK specific parameters will indicate it is coming from a untrusted source and will result in the lowering of its trust factor.

"Call route"—Normal traffic within the UK is expected to route in specific, pre-determined, patterns and expected to arrive at specific interconnection points. As an example, calls originating from a London based caller, are expected to arrive either at London specific local exchanges or London specific tandem exchanges (called DJSU's in the BT network). Calls arriving at interconnect points (SIP or SS7), which are unusual give away the fact that the origin of the call cannot be trusted. Here the call information extraction unit 203 processes the incoming call signalling data to extract the originating point code (OPC) in the SS7 message transfer part (MTP) and compares it to the expected OPC for the incoming N-CLI. Similarly for SIP interconnects, calls from certain N-CLIs are expected to arrive from specific SIP origin points (represented in SIP routing headers) Additional information that may be used is Adjacent Point Code, APC, or Destination Point Code, DPC. It should be noted that, at least in the UK, APC may not be present in call signalling parameters; DPC is implicit in that it is the address of the call information extraction unit 203 which receives the signalling.

"N-CLI different from P-CLI"—which refers to instances where the presentation CLI (P-CLI) is not the same as the network CLI (N-CLI). As this may be indicative of a fraudster attempting to present a different CLI to the receiving party, if this condition is met then the call information extraction unit 203 sets this trust factor to a low value otherwise it sets this trust factor to a high value.

"No CLI or incorrect CLI"—which refers to instances where the call has no N-CLI or P-CLI indicating that the call has been routed via a so-called "grey route". As the routing of a call through such a "grey route" is particularly indicative of suspicious activity (as grey route traffic has been deliberately routed to avoid, for example, local laws and/or regulations), if this condition is met then the call information extraction unit 203 sets this trust factor to a low value, otherwise it sets this trust factor to a high value.

"Diversion"—which refers to instances where the call has been routed via a diverted line, as determined by the call signalling information extraction unit, for example, when a SIP diversion header is identified in the call signalling data. Given that it would not be typical for a genuine user to route their call over a diverted tine when calling, for example, a call centre, if this condition is met then the call information extraction unit 203 sets this trust factor to the value "1", otherwise it sets this trust factor to the value "0".

"Spoofed fixed origin SABCDE"—which refers to instances where the call has originated from a Von) source or potentially a rogue operator. SABCDE codes are number range prefixes that are allocated by the UK telecommunications regulator, Ofcom. Although Ofcom allocates SABCDE codes to a large number of operators within the UK, certain call types, like consumer calls to a financial organisation, are likely to originate from specific operators. As an example, within the UK, a call originating from an N-CLI associated with BT would be more trustworthy than a call originating from an N-CLI associated with a small business line operator. Therefore, if the call information extraction unit 203 detects that the call is from an N-CLI associated with an operator unlikely to host or route calls from expected type of consumers, the call information extraction unit 203 sets this trust factor to a low value, otherwise it sets this trust factor to a high value.

"Spoofed Mobile Origin"—which refers to instances where a potential fraudster is using a UK SIM, such as a pay-as-you-go (PAYG) SIM, to make a call from another country. The fraudster's intention is to present a UK specific N-CLI, to make the call appear as if it is from a UK customer, while the fraudster actually is calling from an international location. Traffic routing data for SMS can provide the country of call origin for any mobile call. Therefore, if the call information extraction unit 203 detects that the call has a mobile N-CLI, it uses a Mobile Application Part (MAP) based traffic query to determine the country where the mobile telephone is located. If the location is international or a suspicious country, the trust factor is set to a low value, otherwise the trust factor is set to a high value. Such information may be used in specific contexts, such as mobile banking. For example, if a given fraudster is using a UK SIM and calling a bank from a non-UK location, say, Africa,—the fraudster is pretending to appear like a genuine UK caller/retail customer whilst they are indeed calling from a different country/region. In a banking scenario, suspicions may consequently arise because few callers are expected to call their bank when roaming in a foreign destination, except in an emergency. Accordingly, the recipient of the call within a bank's call centre may use this information, along with the context of the call, to determine how to treat the call and decide whether the call really is suspicious, or otherwise. It should be noted that use of this factor may lead to false positives (i.e. genuine customers may be highlighted as fraudulent) and, therefore, it will be appreciated that the relative weight of this factor should be maintained at an appropriate level to avoid customer dissatisfaction "Protocol translation encountered"—Satellite or VoIP circuits encountered on call path and based on SS7 parameters, Nature of Connection Indicators and Forward Call Indicators.

"National/International inconsistency"—Where some indicators in the call signalling suggest that the call is an international call, but the N-CLI and P-CLI indicate that the call is an in-country call. This is based on SS7 parameters Forward Call Indicators.

"Calling party type"—In SS7, this is the calling party category parameter that distinguishes the station used to originate a call. If the calling party is not an 'ordinary calling subscriber', for example it may be 'payphone', then this is suspicious.

"Signalling Fingerprint"—On call origination, different switches inject parameters in different sequences and choose to add, or not add, optional signalling parameters. Effectively, this leads to a unique "signalling fingerprint" for each originating operator. Where the CLI points to a specific operator, but the signalling fingerprint points to another, this indicates possible spoofing or porting. As an example, a specific mobile operator in the UK always sends an optional parameter, which other operators don't send. This helps to point to a unique signalling fingerprint for the operator. For example, there may be instances where a customer using an operator (operator X) calls a bank a given number of times over a certain period, thus a signalling fingerprint associated with operator X is stored in a database (discussed below) for that customer. Then, if for example it appears that the same customer calls (as determined from the customer's CLI), but this time using a different operator (operator Y, where operator Y has a different signalling fingerprint to operator X), this may indicate that a fraudster may have socially engineered operator X and ported the customer's number away to operator Y without the customer knowing. In this scenario, the CLI to signalling fingerprint relationship changes and this change can be flagged as being indicative of a higher risk that the caller's number has been ported away and may be being used by a fraudster. Of course, the number porting could be a genuine— however, it is beneficial that the fraud detection system can be used to indicate instances of number porting, as number porting fraud is relatively common.

Of course, many more types of call origin parameters and associated call origin trust factors could be used in addition to or instead of the exemplary parameters discussed above.

Analysis Unit

The call information extracted and the trust factors determined by the call information extraction unit 203 are stored in a database of incoming call network signalling information 205. This information is also transferred to an analysis unit 207 which analyses the extracted call information and the associated trust factors to try to identify patterns associated with fraudulent activity. Such an analysis can be used to determine trends associated with incoming calls. For example, over a given brief period of time (such as a ten minute period), many calls may have been found to have the same origin and/or CLI which is an indication of automated dialling systems placing calls, rather than a person making calls. Another example is where many calls from the same origin attempt to connect to different phone numbers within an organisation, which is an indication of social engineering calls being placed across the organisation to extract and link together information from multiple people within the organisation. The table below indicates the parameters that are stored for each incoming call that allow the analysis unit 207 to perform this trends analysis.

| Stored Parameters for Trend Determination | Use Case |
| --- | --- |
| Date | To determine the date a call enters the network operator server |
| Start Time | To determine the time a call enters the network operator server |
| Ringing Time | To determine the time required for the network operator server to receive confirmation that the call has reached the destination |

| Stored Parameters for Trend Determination | Use Case |
|---|---|
| Answer Time | To determine the time required for the network operator server to receive confirmation that the call has been answered at the destination |
| End Time | To determine the time the call has been dropped because of either the caller or the called party hanging up |
| Duration | To determine the total duration that the call lasted after the call was answered |
| Call direction | To determine if the agent ends the call or the customer ends the call |
| Call drop reason | To determine the reason the call dropped. As an example, this is useful as a 'normal' call drop by a customer immediately on answer is suspicious as they might be trying to reach a particular easy-to-social-engineer agent whereas a call drop by a customer immediately on answer, but due to a lost mobile signal or 'network failure' is not suspicious. |
| Frequency of calls from similar origin | To determine how many times calls from a given origin occur within a given timeframe |
| All trust factors for the call | To determine anomalies by feeding this information along with the other stored information to known anomaly detection algorithms. For example, an ongoing low trust factor for a specific operator would indicate a pattern which indicates that the operator is an ongoing source of fraudulent calls. |
| Extracted objects and key themes from the conversations of the calls using Natural Language Processing algorithms on transcripts of call recordings | To determine pattern anomalies by feeding this information along with the other stored information to a known anomaly detection algorithm. This helps relate the language, topics and sentiment of the call to determine the likelihood of a fraudster being on the call. As an example, this might highlight a trend where fraudsters tend to use aggressive language or discuss specific topics. As more and more of such calls get tagged as fraudulent, the correlation helps rate future calls better. |
| Pattern of Dual Tone Multi Frequency, DTMF, digit tones recorded during the call | To determine pattern anomalies by feeding this information, along with the other stored information, to a known anomaly detection algorithm. This helps detect cases where a fraudster exploits a contact center's IVR system to attempt to get partial customer information. As an example, a fraudster might try to login entering a customer's year of birth repeatedly until they get it right. |
| Call Origin details - the N-CLI, P-CLI and the operator registered against the SABCDE prefix. | To determine pattern anomalies by feeding this information along with the other stored information to anomaly detection algorithm. |
| The feedback from the agent, which labels the call with a call outcome to indicate whether the call was found to be fraudulent or not. | To determine pattern anomalies by feeding this information along with the other stored information to anomaly detection algorithm, using supervised learning. |

As shown in FIG. 2, the analysis unit 207 also reads data from a call outcome database 209 which stores information relating to previously placed calls and determinations about fraudulent activity (using the feedback information provided by the call centre 103). As will be described in more detail later, the analysis unit 207 uses the data in the call outcome database 209 to determine patterns of activity that are Likely to be associated with fraudulent activity. The determined patterns are stored in an incoming call trends database 211.

Fraud Scoring Unit

A fraud scoring unit 213 then analyses the call information stored in the extracted call information database 205, the trends information stored in the incoming call trends database 211 and any call outcome information stored in the call outcomes database 209, to determine a fraud score based on a confidence level in respect of the likelihood of the call being a malicious (fraudulent) call, relative to a genuine call. Data held in third party databases (not shown) may also be connected to the fraud scoring unit to provide further beneficial input/call trust factors when determining the fraud score for an incoming call. For instance, the Telecommunications UK Fraud Forum (TUFF) database, may provide some information held within historical call data records in respect of malicious calling parties.

When analysing the call origin trust factors stored in the database 205, the fraud scoring unit 213 may apply weightings to the trust factors which reflect the confidence associated with the different trust factors. For example, each of the trust factors discussed above may have a respective fixed weighting associated with it such that when an incoming call is being analysed the call origin trust factors are determined which the fraud unit scoring unit 213 combines with the weightings associated with the determined trust factors to give a fraud score for the incoming call. Of course, the values of the weightings may not be fixed and can vary depending on the combination of trust factors determined for the incoming call. The fraud scoring unit 213 may be implemented as a supervised machine learning system—such as a neural network, with feedback from the call centre related to specific calls to help adapt the weights of the neural network. In this case, the input to the neural network could be a vector of values, with each value being associated with one of the call origin trust factors and each value depending on the presence or absence of the associated call origin trust factor for the incoming call. Other machine learning systems such as expert systems or fuzzy logic systems could be used instead of a neural network.

To illustrate the basic principle of the operation of the fraud scoring unit 213, the following table gives a simple example, with a single trust factor being considered—whether or not the P-CLI has been withheld and using historical call information relating to the network (N-CLI) of the caller.

| CLI Withheld? | Advised as Source of Fraud? | Rating | Reason Code |
|---|---|---|---|
| No | No | X (High) | 1 |
| Yes | No | Y (Medium) | 2 |
| No | Yes | Z (Low) | 3 |
| Yes | Yes | Z' (Low) | 4 |

Thus looking at the first line of the table, if the P-CLI has not been withheld and there is no historical data relating to the N-CLI indicating that this caller is a source of historical fraudulent calls, then the fraud scoring unit 213 determines a fraud score for the incoming call as "X" (high score). In this embodiment, the network operator server 101 provides the determined fraud score to the call centre 103 together with a "reason" code that indicates the reason for the fraud score. This helps the agent receiving the call understand the reason why such a fraud score has been provided. In this example, a reason code of "1" is given indicating that the user has not withheld his P-CLI and there is no historical knowledge of fraudulent activity by this caller.

Looking now at the second line of the table, if the P-CLI has been withheld and there is no historical data relating to the N-CLI indicating that this caller is a source of historical fraudulent calls, then the fraud scoring unit 213 determines a fraud score for the incoming call as "Y" (medium score); which the network operator server 101 provides to the call centre 103 together with a reason code of "2" indicating that the user has withheld his P-CLI but there is no historical knowledge of fraudulent activity by this caller.

Looking now at the third line of the table, if the P-CLI has not been withheld but there is historical data relating to the caller's N-CLI indicating that this caller has been a source of historical fraudulent calls, then the fraud scoring unit 213 determines a fraud score for the incoming call as "Z" (low score); which the network operator server 101 provides to the call centre 103 together with a reason code of "3" indicating that although the user has not withheld his P-CLI there is historical knowledge that this caller has been the source of fraudulent calls.

Finally, looking at the fourth line of the table, if the P-CLI has been withheld and there is historical data relating to the caller's N-CLI indicating that this caller has been a source of historical fraudulent calls, then the fraud scoring unit 213 determines a fraud score for the incoming call as "Z'" (low score); which the network operator server 101 provides to the call centre 103 together with a reason code of "4" indicating that the caller has withheld his P-CLI and there is historical knowledge that this caller has been the source of fraudulent calls.

As discussed above, the agents in the call centre provide feedback on calls that have been routed to them. This feedback information will identify the call using the unique call code associated with the call. This feedback may be provided for every call or just for some calls—in particular where the fraud scoring unit was not correct with its fraud score determination. For example, the feedback may be to confirm that a call was not fraudulent or malicious when the fraud scoring unit determined that the call may be fraudulent or conversely the feedback may confirm that a call was from a malicious/fraudulent user when the fraud scoring unit determined that the call was unlikely to be fraudulent. The feedback on the outcome of a call could, for example, take the form of a reason code manually input by an agent or automatically generated and input by a machine, as relevant, into an application program interface (API), such as a web-API.

The feedback provided by the call centre is used to update the call outcome database 209 so that if the same caller calls again the fraud scoring unit can determine a more accurate fraud score for the incoming call. Of course, the feedback information is not used just to provide feedback on a specific caller, it also provides information that can be used to determine broad categories of caller who may be trying to make fraudulent or malicious calls. For example, the analysis unit 207 may identify a trend in the feedback information that callers from a particular geographic region or area are more likely to be fraudulent than callers from other geographic areas; or that callers from a particular geographic area are likely to be fraudulent within a particular time period during the day. The feedback also allows the analysis unit 207 to identify possible patterns of fraudulent activity associated with users of a particular rogue network operator.

The above example is a relatively simple example illustrating how the fraud scoring system works using a few trust factors. A more detailed example illustrating the way in which the fraud scoring system operates will now be described. In this detailed example, three calls, each with 12 trust factors, are analysed to determine a fraud score for each call.

Once the call signalling extraction unit 203 has extracted the values of the call trust factors from the call signalling information for the incoming call, the fraud scoring engine 213 determines a numeric trust score for each trust factor indicating a degree of confidence for that trust factor. As will be described in more detail below these numeric trust scores are combined to give an overall fraud score for the call. In this example, the numeric trust score assigned to each trust factor value is defined as a percentage in the range of 1% to 100%; where 1% is the lowest degree of trust and 100% is the highest degree of trust. As some trust factors are more indicative of fraudulent activity than other trust factors, the numeric trust scores are weighted with a weighting specific to the corresponding trust factor.

The following three tables A to C show the trust factors which the call information extraction unit 203 extracts from each of the three calls—call 1, call 2 and call 3. The numeric trust scores and the weight associated with each trust factor are shown in each of the tables for the 12 trust factors being analysed in this example.

TABLE A

| Trust Factor | CLI Withheld Yes - 1% NO - 100% | Call Type Fixed - 100%/ Mobile - 75%/ International - 25%/ VoIP - 1% | CLI Screened Yes - 100% No - 1% | UK Specific parameters present No - 1% Yes - 100% |
|---|---|---|---|---|
| Trust factor weight | 0.1 | 0.05 | 0.1 | 0.05 |
| Call 1 - Value | No | Fixed | Yes | Yes |
| Call 1 - Trust | 100% | 100% | 100% | 100% |
| Call 1 - Weighted trust | 0.1 | 0.05 | 0.1 | 0.05 |
| Call 2 - Value | Yes | International | Yes | Yes |
| Call 2 - Trust | 1% | 25% | 100% | 100% |
| Call 2 - Weighted trust | 0.001 | 0.0125 | 0.1 | 0.05 |
| Call 3 - Value | Yes | International | No | No |
| Call 3 - Trust | 1% | 25% | 1% | 1% |
| Call 3 - Weighted trust | 0.001 | 0.0125 | 0.001 | 0.0005 |

TABLE B

| Trust Factor | N-CLI-not equal P-CLI No mismatch - 100% First 7 digits match - 75% First 7 digits mismatch - 25% | Invalid CLI No CLI - 50% Incorrect CLI - 75% Correct CLI 100% | Diversion encountered Yes 75% No 100% | Spoofed fixed origin SABCDE Low score previously for calls from this SABCDE 0% High score previously for calls from this SABCDE 100% | Spoofed Mobile Origin Country of origin same as CLI country - 100% Country of origin different from CLI country - 0% |
|---|---|---|---|---|---|
| Trust factor weight | 0.1 | 0.1 | 0.05 | 0.15 | 0.1 |
| Call 1 - Value | No mismatch | Correct CLI | No | High score | Same origin |
| Call 1 - Trust | 100% | 100% | 100% | 100% | 100% |
| Call 1 - Weighted trust | 0.1 | 0.1 | 0.05 | 0.15 | 0.1 |
| Call 2 - Value | No mismatch | Correct CLI | No | High score | Same origin |
| Call 2 - Trust | 100% | 100% | 100% | 100% | 100% |
| Call 2 - Weighted trust | 0.1 | 0.1 | 0.05 | 0.15 | 0.1 |
| Call 3 - Value | No mismatch | Correct CLI | No | High score | Same origin |
| Call 3 - Trust | 100% | 100% | 100% | 100% | 100% |
| Call 3 - Weighted trust | 0.1 | 0.1 | 0.05 | 0.15 | 0.1 |

TABLE C

| Trust Factor | Signalling Fingerprint Yes - 75% No - 100% | Protocol Translation Encountered Satellite - 10% VoIP - 50% None - 100% | Frequency of Origin 10 in last hour - 25% 10 in last day - 50% Less than 2 in last day - 100% | Fraud Score | Reason for trust factor |
|---|---|---|---|---|---|
| Trust factor weight | 0.05 | 0.05 | 0.1 | 1 | |
| Call 1 - Value | No | None | 1 | — | — |
| Call 1 - Trust | 100% | 100% | 100% | — | — |
| Call 1 - Weighted trust | 0.05 | 0.05 | 0.1 | 1 | N/A |
| Call 2 - Value | No | None | 1 | — | — |
| Call 2 - Trust | 100% | 100% | 100% | — | — |
| Call 2 - Weighted trust | 0.05 | 0.05 | 0.1 | 0.8635 | "Withheld" "International" |
| Call 3 - Value | No | None | 10 in last hour | — | — |
| Call 3 - Trust | 100% | 100% | 25% | — | — |
| Call 3 - Weighted trust | 0.05 | 0.05 | 0.025 | 0.64 | "Withheld" "International" "Not Screened" |

TABLE C-continued

| Trust Factor | Signalling Fingerprint | Protocol Translation Encountered | Frequency of Origin 10 in last hour - 25% 10 in last day - 50% Less than 2 in last day - 100% | Fraud Score | Reason for trust factor |
|---|---|---|---|---|---|
| | Yes - 75% No - 100% | Satellite - 10% VoIP - 50% None - 100% | | | |

"UK parameters not present" "Frequent"

Table A shows the first four call factors, "CLI Withheld", "Call Type", "CLI Screened" and "UK Specific parameters present"; Table B shows five further call factors, "N-CLI not equal P-CLI", "Invalid CLI", "Diversion encountered", "Spoofed fixed origin SABCDE" and "Spoofed Mobile Origin"; and Table C shows three further call factors "Signalling Fingerprint", "Protocol Translation Encountered" and "Frequency of Origin". Referring to table A, the weight of "CLI Withheld" is set as 0.1 and the trust score is set to 1% if the CLI is withheld, i.e. the value of the trust factor is "Yes", and 100% if the CLI is not withheld, i.e. the value is "No". Thus for call 1, the value is "No", which means the CLI is not withheld (indicative that a high degree of trust may be expected) and hence the weighted trust score for call 1 for this trust factor is determined as 0.1 (100% of the 0.1 trust factor weight). For call 2, the value is "Yes", which means the CLI is withheld (indicative of a low degree of trust) and hence the weighted trust score is determined to be 0.001 (i.e. 1% of the 0.1 trust factor weight). Call 3 has the same weighted trust score as call 2 for this trust factor.

Weighted trust scores are determined in a similar way for each of the other 11 different trust factors (defined in the different columns of Tables A to C). The fraud score for a call is then determined by combining the weighted trust scores that have been calculated for the call. In this example the weighted trust scores are combined by summing them, although in other embodiments they may be combined by multiplying them together or using some other numeric combination. The calculated fraud scores for the three calls are given in the penultimate column of Table C. The fraud scoring engine also determines a reason for the fraud score when a maximum score is not obtained, such as "Withheld", which refers to the CLI being withheld. This reason is shown in the last column of Table C and may be presented to the called party, if desired.

Call Switching Unit

The fraud score and the reason code together with the unique call ID assigned to the incoming call are sent to the call switching unit 201; which uses the call ID to identify the incoming call to which the fraud score relates (it is likely that the call switching unit 201 will be handling many calls at the same time). The call switching unit 201 then uses the destination number in the incoming call and the determined fraud score to look up a routing table 200 to determine an actual destination number to which to the incoming call should be sent. The table below is a conceptual view of the routing table 200 used in this embodiment.

| General telephone number for call centre #1 | High Score Medium Score Low Score | Destination 1 Destination 2 Destination 3 |
|---|---|---|
| . | . | . |
| . | . | . |
| General telephone number for call centre #103 | High Score Medium Score Low Score | Destination 307 Destination 308 Destination 309 |
| . | . | . |
| . | . | . |
| General telephone number for call centre #n | High Score Medium Score Low Score | Destination 3n-2 Destination 3n-1 Destination 3n |

As shown, the routing table 200 has, in the left hand column, the general telephone number associated with each of the network operator's subscribers. In this example the general telephone numbers for call centres #1 to #n. The middle column has an entry for each of the different possible fraud scores that may be determined by the fraud scoring unit 213 for each of the call centres; and the right hand column includes a destination telephone number for the desired destination of the call, dependent on the determined fraud score.

Thus, for example, if the fraud scoring unit 213 determines that the incoming call for call centre 103 has a medium fraud score then the call switching unit 201 uses the destination number in the incoming call to identify that the incoming call is for call centre #103; and uses the determined fraud score to determine that the destination number to which the call should be forwarded is destination number D308—which is the telephone number needed to route the call to the agent terminal (or group of agent terminals) 115-2 in the call centre 103. The call switching unit 201 then forwards the incoming call as an outgoing call to the determined destination. In this embodiment, the call switching unit 201 also includes the determined reason code with the forwarded call (so that the agent that receives the call can understand the reason why the call has been forwarded to them) together with the unique ID that the call switching unit 201 associated with the incoming call. The provision of the unique call ID allows the agents in the call centre 103 to be able to identify the call when providing feedback to the network operator server 101.

As those skilled in the art will appreciate, the routing table 200 that is used is unlikely to have the exact structure illustrated above—it is likely that the routing table 200 will be in the form of a simple hash database that uses the destination number from the incoming call and the determined fraud score as an input to the database and which outputs the corresponding destination number.

"Age"—Based Fraud Detection

Fraud detection systems seek to identify calls made by fraudulent users and once a call is identified as being fraudulent, the telephone number from which the call (purportedly) originates is blocked so that the fraudulent user can no longer use that number to access the telephony system. This means that fraudsters frequently have to update the telephone number that they use to make the fraudulent calls. The inventor has therefore realised that the age of the telephone number or SIM card that the fraudster is using can be used as an additional or alternative trust factor in the fraud detection system described above.

Figure 3:
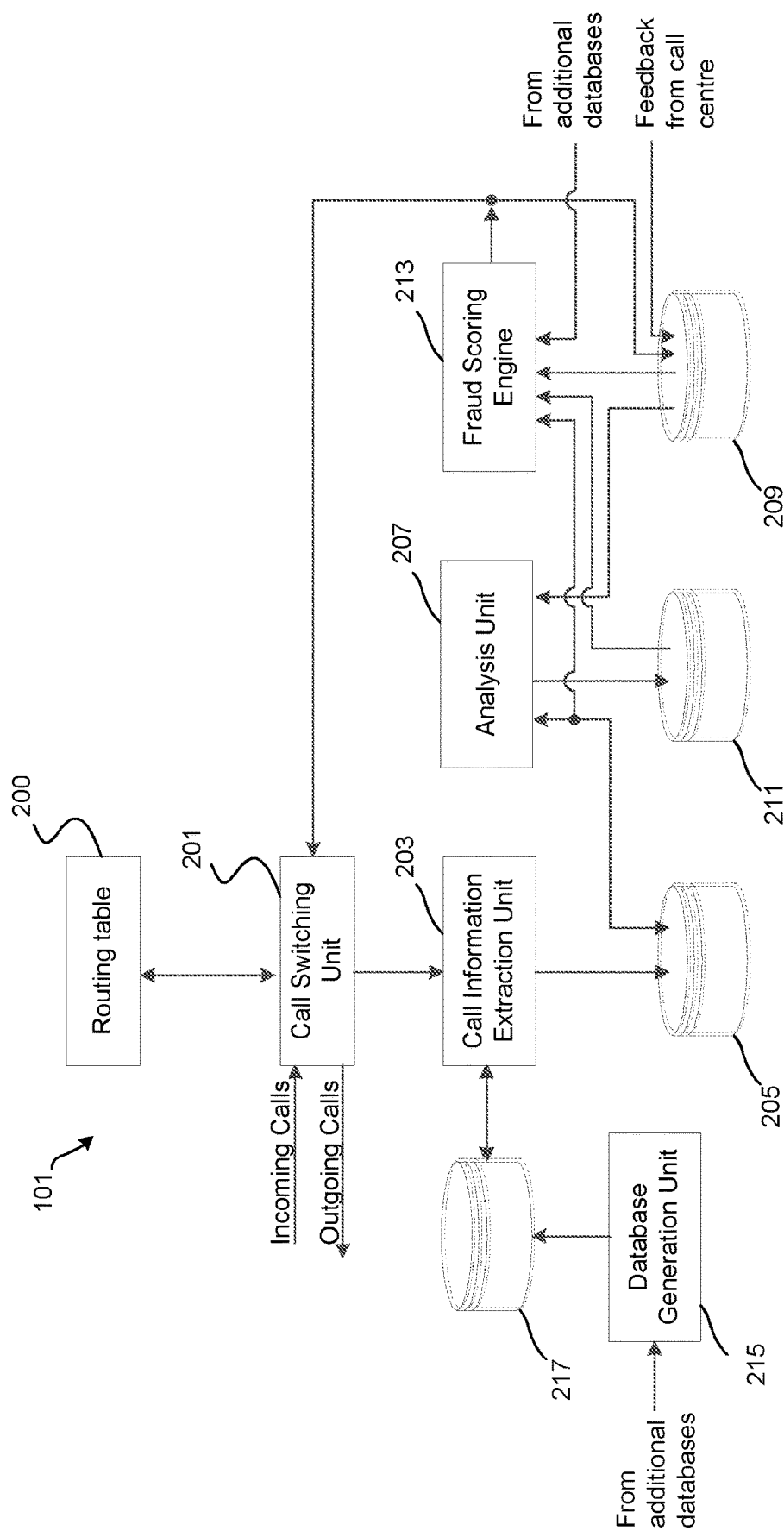
FIG. 3 schematically illustrates an alternative network operator server that may be used in the system shown in FIG. 1.

FIG. 3 illustrates the main parts of such an embodiment that uses the age of the telephone number as a trust factor in the fraud detection system. The same reference numerals have been used for like elements and a description of these elements will not be given again.

As shown, in this embodiment, a new age database 217 is provided that includes age information for different mobile telephone numbers. Ideally, a publically available database would be used that identifies when each mobile telephone number was provisioned and activated. However, at present, such a database (with all provisioned mobile telephone numbers) is not publically available, although it may become available in the future. The inventor has, however, found that there are publically available databases that contain data from which it is possible to estimate the age of the phone number of the incoming call.

For example, the UK telecommunications regulator, Ofcom, provides UK telecommunications operators with information and databases related to "The National Telephone Numbering Plan". One database of this plan, and which is frequently updated by Ofcom, is the "numbering data" database which holds data on which UK telephone numbers are available for allocation or have been allocated. Another database is Ofcom's "number block allocations" database (which holds lists of number allocations made by Ofcom over a rolling 12-month period). Information obtained from these databases can be used to determine how "new" a telephone number is from which the fraud detection system can determine a likelihood of an incoming call being fraudulent.

Ofcom allocates blocks of telephone numbers to each communications provider (i.e. telecommunications network operators such as Vodafone, O2, EE etc.). The block size may be in the order of 10,000 numbers (sometimes referred to as a "10 k mobile range") to 100,000 numbers (sometimes referred to as a "100 k mobile range"). The Ofcom databases identify the communications provider to whom each block of telephone numbers has been allocated and when the block of telephone numbers was allocated. Unfortunately, the network operators do not all immediately activate the telephone numbers from the block of numbers when they are allocated. However, the inventor has found by analysing the applicant's historical call records that each network operator has a pattern to the way in which it activates telephone numbers once it has been allocated a new block of telephone numbers. For example, some communication providers take on average a year from the date that a block of numbers is allocated to them to start to activate the telephone numbers from that block, whereas other communication providers take 3 years and others 5 years. A database generation unit 215 therefore uses this observed pattern of "allocation to activation" behaviour for each network operator to estimate when each block of numbers is actually activated and it uses this information to build a new database (age database 217) that the fraud detection system can use to look-up an approximate age for the telephone number of an incoming call.

Database Generation Unit

The way in which the database generation unit 215 generates the new age database 217 will now be explained in more detail. This process is typically carried out by the database generation unit 215 "off-line" (in advance of the fraud detection) and may be repeated from time to time to update the age database 217 to reflect changes in observed behaviours of the communications providers in relation to their allocation to activation pattern. Initially, the Ofcom numbering data database is retrieved from Ofcom's servers (not shown). Part of this database is illustrated below by way of example:

| SABC | D/DE | Status | Date | Communications Provider | Use | Notes | Change |
|------|------|--------|------|------------------------|-----|-------|--------|
| 7700 | 09 | Allocated | | Communications Provider X | Mobile Services | 10 Digit Numbers | January 2015 |
| 7700 | 1 | Allocated | | Communications Provider Y | Mobile Services | 10 Digit Numbers | February 2016 |
| 7700 | 2 | Allocated | | Communications Provider Z | Pager Services | 10 Digit Numbers | April 2016 |
| 7700 | 3 | Allocated | | Communications Provider X | Mobile Services | 10 Digit Numbers | May 2016 |

The database generation unit 215 then extracts all the database entries that have "Mobile Services" in the "use" column. The database generation unit 215 then concatenates the two numbers in the "SABC" and "D/DE" columns to give a five or six digit number corresponding to the first five or six digits (excluding the "+44" or "0" prefix) of the telephone numbers that are common within the allocated block of numbers. If the block is a block of 10,000 numbers then these columns will have six digits and if it is a block of 100,000 numbers then these columns will contain five digits. The database generation unit 215 also extracts the communications provider (i.e. network operator) to whom the block of numbers was allocated together with the change date—which identifies the date on which the block of numbers was allocated to the communications provider.

The database generation unit 215 then analyses the applicant's own call records to identify when calls from numbers within each block of numbers were first received within the applicant's telecommunications systems. The database generation unit 215 is also able to search other on-line databases (such as social media databases like Facebook and LinkedIn) to identify when telephone numbers in each block of numbers started to be used. This analysis identifies an "allocation to activation" pattern for each communications provider. In this embodiment, this pattern is simply the average period of time (in months) that the communications provider takes to activate telephone numbers once those numbers are allocated to them. The database generation unit 215 then adds this allocation to activation pattern to the corresponding change date to give an approximate activation date for the block of telephone numbers. The resulting age database 217 generated by the database generation unit 215 for the above example is illustrated below:

| SABC & D/DE | Communications Provider | Activation Date |
|---|---|---|
| 770009 | Communications Provider X | August 2015 |
| 77001 | Communications Provider Y | April 2017 |
| 77003 | Communications Provider X | February 2017 |

As can be seen from this example (and comparing the change date with the activation date), communications provider X takes on average eight months from when a block of numbers is allocated to it to start activating numbers from the block and communications provider Y takes on average fourteen months.

Subsequently, when the fraud detection system is running and an approximate age of the telephone number of an incoming call is to be determined the call information extraction unit 213, performs the following processing:
 1) The telephone number of the incoming call is extracted as per the first embodiment.
 2) Then the prefix "+44" or "0" is removed from the telephone number (e.g. +447700900999→7700900999).
 3) The first five or six digits from the resulting number (e.g. 770090) are then extracted.
 4) The extracted digits are then used to look up the relevant entry in the age database 217 (identify the block of telephone numbers matching the extracted five or six digits—if the extracted five digits matches multiple blocks in the database 217 then the sixth digit is used to identify the correct block containing the telephone number of the incoming call).
 5) An approximate age for the telephone number of the incoming call is then determined by determining the number of years (or months) between the date of the incoming call and the activation date stored in the age database 217 for the block of numbers containing the telephone number of the incoming call.

This number of years (or months) can then be used as an added trust factor by the fraud scoring engine 213 when determining a fraud score for an incoming call, or the age can be used on its own as a fraud score indicating the level of trust in the incoming call. Typically, the lower (younger) the age of the telephone number the higher the likelihood that the caller is fraudulent and the fraud score that is calculated reflects this accordingly.

The above described embodiment explains how an age of the phone number associated with the incoming call can be estimated. Of course, many changes may be made to the above process. For example, the block size of mobile numbers does not need to be of the same size. Other block sizes (including a mixture of block sizes) could be used. If smaller block sizes are used then six or more digits of the incoming telephone number may need to be extracted for looking up in the age database 217.

Moreover, the above discussed determination could be supplemented with information from other public databases of telephone numbers which are in use. Examples include, but are not limited to, numbers listed on websites, in directories, in advertisements and the like. For example, the predicted age for a telephone number could be cross-referenced to the information held in such supplementary databases and used to increase the confidence associated with the prediction. Thus if the predicted age of the telephone number is 7 years old, and the telephone number can be found in a telephone directory dated 7 years ago, then there is a greater confidence associated with the predicted age and therefore an increased confidence that the call is not fraudulent can be given.

The "age"-based fraud detection has been described in this embodiment as providing an additional trust factor for performing a fraud scoring analysis by the fraud scoring system. However, it will be understood that "age" based fraud detection may be performed independently of the other trust factors used in the first embodiment described above.

For example, the fraud detection system illustrated in FIG. 3 could be made available to third party servers whose calls are not routed through the network operator server 101 and who simply want to find out the age of a telephone number. In such a system, the third party server would provide the telephone number to be checked and the call information extraction unit 203 would use the telephone number provided by the third party server (for example via a suitably programmed application program interface (API)) to work out an approximate age of the telephone number using the information in age database 217 in the manner discussed above. The determined age can then be returned to the third party server which can then perform its own fraud analysis based on the returned age.

Moreover, when an organisation is called by a customer to transact on one of their service accounts (e.g. their telephone service account, bank account or energy account, etc.), the organisation/call centre 203 needs to identify the caller's customer account and then verify that the caller is who they claim to be—this process is known as Identification and Verification (IDEtV).

Verification can be performed at different levels of authentication depending upon the type of service transactions that a customer can perform on the call, e.g. whether in an automated fashion through an automated IVR system or by talking to an agent in a contact centre. For example, a lower level of authentication obtained by verifying limited details from the customer may allow a customer calling a bank to check their balance, but may not allow them to transfer money. The level of authentication required for various service transactions is governed by the internal policies of the organisation and/or local regulatory requirements.

The inventor has realised that the fraud detection system described above can also be used as (at least part of) a pre-authentication system for the organisation, before the call reaches the organisation's call centre (IVR system or contact centre agent). As the caller is pre-authenticated, when the call reaches the call centre it allows some customer transactions to be completed in an automated way or if the call is handled by a human agent, it enables the agent to ask fewer questions to elevate the authentication level for more secure transactions.

Figure 4:
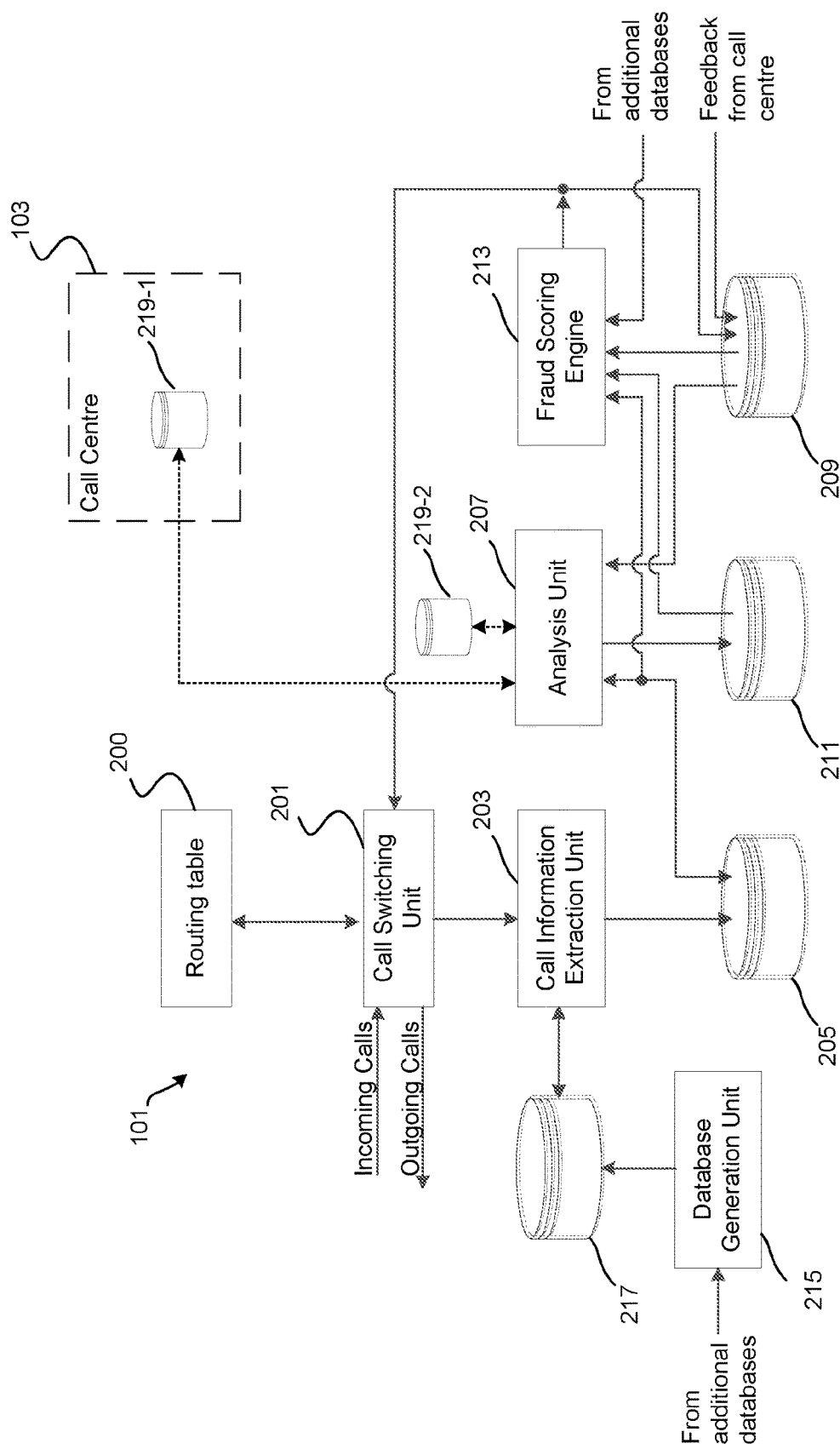
FIG. 4 schematically illustrates an alternative network operator server that may be used in the system shown in FIG. 1.

The way in which the fraud detection system described above can be used as part of this pre-authentication will now be described with reference to FIG. 4.

When a caller calls in for the first time, the fraud detection server 101 operates in the manner described above to determine a fraud score for the incoming call and then the fraud detection server 101 forwards the incoming call to the call centre 203 together with a unique call identifier and the fraud score determined for the call. As discussed above, details of the call signalling information extracted from the incoming call by the call information extraction unit 203 are stored in the database 205. This extracted call signalling information may include the 'Network CLI', 'Presentation CLI' and the 'Signalling Fingerprint' for that incoming call (as discussed above). This information for the incoming call (referred to hereinafter as the 'call DNA') is stored in the database 205 together with the unique call identifier assigned to the call by the call switching unit 201.

The call is then routed to the call centre 203 as before, where the caller is authenticated using existing authentication techniques (such as username and password verification or voice recognition etc.). Once authenticated, the call is associated with a customer account number within the organisation's customer relationship management (CRM) system. Further, if the call centre 203 determines that the caller should be registered for "pre-authentication", for example by determining that the fraud score for the call is below a threshold, then a registration entry within a registration database 219 is created that associates the 'call DNA' for the call with the customer account number. As shown in FIG. 4, this registration database 219 may reside within the network operator server 101 or within the call centre 203.

If the registration database resides in the call centre 203, then when setting up the registration entry in the registration database 219-1, the call centre 203 uses the unique call identifier associated with the call to request the 'call DNA' from the network operator server 101, which the call centre 203 stores in the registration database 219-1 associated with the customer account number. This request could be done, for example, through an HTTPS GET request sent to the analysis unit 207 of the network operator server 101.

If the registration database 219 resides in the network operator server 101, then the call centre 203 feeds back to the network operator server 101 that the call was associated with a genuine caller. The information fed back by the call centre 203 to the network operator server 101 includes: i) the unique call identifier for the call so that the network operator server 101 can identify the call to which the feedback relates; and ii) the customer account number for the caller. As shown in FIG. 4, this feedback is provided to the database 209 and can be carried out using, for example, an HTTPS POST request. In response to or after receiving this feedback, the analysis unit 207 retrieves the call DNA associated with the unique call identifier (provided in the feedback) from the database 205 and it stores this call DNA in association with the customer account number in the registration database 219-2.

When a caller who has been registered in the above manner calls again, if the call DNA for their subsequent call matches (is the same as or is substantially the same as) the call DNA stored in the registration database 219, then they can be pre-authenticated to the call centre 203. The way in which this pre-authentication is performed depends on where the registration database 219 resides.

If the registration database 219-1 resides within the call centre 203, then the incoming call is initially received by the call switching unit 201 of the network operator server 101 and the 'call DNA' and the unique call identifier are generated for the incoming call and the call is forwarded to the call centre 203 in the manner previously discussed.

When the call reaches the call centre 203, the call centre 203 sends a request for the call DNA to the network operator server 101. The request includes the unique call identifier to allow the network operator server 101 to retrieve the corresponding call DNA from the database 205. The network operator server 101 then returns the call DNA to the call centre 203. The call centre 203 then matches the received call DNA with all the call DNA stored in the registration database 219-1 to see if there is a match. If there is no match, then the call centre authenticates the caller in the conventional manner. If there is a match, then the customer account number associated with the matching call DNA is retrieved from the registration data base 219-1 and the call is passed either to an automated call handling system (IVR) or a human agent together with the customer account number to confirm the caller's pre-authentication.

If the registration database 219 resides within the network operator server 101, the call is initially processed in the same manner as for original calls—i.e. the network operator server 101 extracts the call DNA for the call and determines a fraud score for the incoming call and then forwards the incoming call together with the unique call identifier and fraud score to the call centre 203. The call centre 203 then sends a request (including the unique call identifier) back to the network operator server 101 to see if the caller has already been registered and if the caller has been registered to return the customer account number for the caller that is stored in the registration database 219-2. In response to this request, the analysis unit 207 uses the unique call identifier in the request to retrieve the call DNA for the call from the database 205. The analysis unit 207 then matches this call DNA with the call DNA stored in the registration database 219-2. If there is a match, then the network operator server 101 returns the customer account number for the call to the call centre—thereby informing the call centre 203 that the caller is authenticated for this customer account number. If there is no match in the registration database, then the network operator server 101 indicates that there is no match in the registration database (or simply does not respond to the request).

In an alternative embodiment, when the registration database 219-2 is stored in the network operator server 101 and the call DNA is extracted for the call as before, the analysis unit 207 matches the extracted call DNA with the call DNA stored within the registration database 219-2 automatically without being requested to do so by the call centre 203. If there is a match, then the analysis unit 207 retrieves the customer account information from the matching registration database entry held in registration database 219-2 and forwards the call, together with the retrieved customer account number, to the call centre 203 thereby indicating that the caller has been pre-authenticated. However, if the analysis unit 207 determines there is no matching call DNA in the registration database 219-2, then the fraud scoring engine 213 determines a fraud score for the incoming call and the call is forwarded to the call centre 203 together with the determined fraud score and the unique call identifier, in the manner discussed above.

Modifications and Alternatives

Detailed embodiments of a fraud detection system have been described above. As those skilled in the art will appreciate, various modifications and changes to the above embodiments are possible and some of these will now be described.

In the above embodiments, the call switching unit formed part of the network operator server. This is not essential. The call switching unit could form part of the PSTN or the call centre. If the call switching unit forms part of the call centre, then the routing tables used would only include the destinations specific to that call centre.

In the above embodiments, the fraud scoring unit determined a fraud score for an incoming call as being one of three possible levels—low, medium and high. As those skilled in the art will appreciate, different levels of fraud score may be provided. Further it is not essential that alt subscribes require the server to use the same fraud scoring method. Different methods may be used for different subscribers, with each subscriber having a different number of destinations depending on the granularity provided in the number of fraud levels that are determined for that subscriber.

In the above embodiments, the databases within the network operator server have been described as being independent from one another. Alternatively, the databases may be combined into a single database.

In the above embodiments, the fraud score has been described as having a high score when there is a high likelihood that the incoming call is fraudulent and a low score when there is a low likelihood that the incoming call is fraudulent. As those skilled in the art wilt appreciate, this is not essential—a low score could correspond to a high likelihood of fraud and a high score could correspond to a low likelihood of fraud—it depends on the way in which the score is calculated.

In the above embodiments, the network operator server determined possible fraudulent activity in relation to incoming calls. A similar fraud detection service can be provided in relation to other communications such as SMS or MMS communications. For example, and in relation to the extracted call origin parameter "call route", SIGTRAN, at least in the UK, is used in respect of SMS related signalling. Information within SIGTRAN (SCCP) messages, such as Global Title (GT), may be to determine fraud in receiving SMS. For instance, the number displayed on a received SMS is very similar to a presentation number and can be set as anything by a source network, while the underlying Global Title address gives away the true origin of the message (number/operator/country).

In the above embodiments, the fraud score is used to determine where a call should be routed. Alternatively, the fraud score may be forwarded to the associated destination using any one of: performing a GET request for the fraud score using a computer interface, e.g. an Application Program Interface (API); injecting the fraud score into the extracted call signalling data for the call being forwarded in a predetermined format and parameter; and injecting the fraud score as a call whisper into the call itself rather than the signalling for the call. Advantageously, in the case of the call whisper (i.e. the injection of a short message which is played out as sound to the called party/agent as soon as the call is answered by the called party/agent) an API may not need to be provisioned between the fraud scoring system and the called parties' terminal, because the short message may simply state, "Caution, high risk of a fraudulent caller!"—and thus the called party has received an alert without the need for an API.

In the above embodiments, the fraud score was effectively indicated by selecting a destination telephone number to which the call was routed. In other embodiments, the fraud score may be sent to the associated destination together with the call to a generic destination number associated with the call and the destination then uses the fraud score to determine how the call is handled internally. Alternatively, the fraud score may be forwarded separately from the call to the destination associated with the call. The fraud score may be sent to a different server associated with the destination. For example the call may be forwarded to a generic call centre number and the fraud score may be sent to a different server inside the call centre. The fraud score may be sent automatically or sent in response to a request received from a remote server.

In the above embodiments, the network operator server assigned a unique call ID to each incoming call and provided this to the subscriber so that feedback can be given on the right call. This is not essential. In some embodiments no feedback may be given—in which case it is not necessary to provide the call ID to the subscriber.

In the above embodiments, an analysis unit analysed the historical call data to identify trends indicative of fraudulent activity. This is not essential. The fraud score may simply be generated for each user (N-CLI) based on their historical call record.

The fraud scoring system described above can also be used to reduce the effects of malicious users attempting to attack a call centre in a "denial-of-service (DoS)" type of attack. For instance, a machine may be programmed, such as a bulk SIP dialler, to call the call centre at an extremely high frequency in an attempt to overwhelm the channels available to genuine customers, thereby resulting in a negative experience for those customers as they wilt essentially be denied service. The analysis unit may detect the large number of calls coming from the same source and may use a special code to identify such a situation to the call centre. This unique code can then be used to allow the call centre to simply drop the relevant calls—thereby preventing the calls from preventing real customers gaining access to the agents of the call centre. Alternatively, the call centre may provide a dedicated "destination" to the network operator server that should be used in this circumstance so that these high frequency calls are routed to this destination. The call centre may then just drop the calls or assign a smaller pool of terminals to process the calls. In some embodiments, the network operator server may be instructed to drop the fraudulent incoming calls in this circumstance—so that they are not even routed through to the call centre.

The network operator server has been described as having various units and databases. This hardware may be provided by dedicated hardware circuits or by using general purpose hardware (such as a CPU) and software stored in memory. In the latter case, the different units may be defined by different software modules forming part of the overall software of the network operator server.

In the above embodiment, the call information extraction unit 203 performed processing to determine the age of the telephone number. This is not essential. The analysis unit 207, or the fraud scoring engine/unit 213, may determine the age of the telephone number, rather than the call information extraction unit 203.

Various other modifications will be apparent to those skilled in the art and will not be described in further detail here.

The present application also includes the following numbered clauses:

1. A fraud detection system comprising:
   a call switching unit for receiving an incoming call;
   a call information extraction unit for processing the incoming call to extract call signalling information associated with the incoming call; and
   a fraud scoring unit for determining a fraud score associated with the incoming call using the extracted call signalling information, the fraud score indicating a likelihood that the incoming call is from a fraudulent caller; wherein the call switching unit is configured to forward the incoming call to one of a number of different destinations based on the fraud score determined by the fraud scoring unit.
2. The fraud detection system of clause 1, wherein the incoming call has a plurality of associated destinations and wherein the call switching unit is configured to select one of the associated destinations based on the determined fraud score.
3. The fraud detection system of clause 1 or 2, further comprising a call signalling information extraction unit that is configured to process the extracted call signalling information to determine one or more call trust factors for the incoming call and wherein the fraud scoring unit is configured to determine the fraud score for the incoming call using the determined call trust factors for the incoming call.
4. The fraud detection system of clause 3, wherein the call signalling information extraction unit is configured to determine whether or not the calling party is hiding a presentation CU, P-CU.
5. The fraud detection system of clause 3 or 4, wherein the call signalling information extraction unit is configured to determine whether or not the signalling information of the incoming call comprises a network CU, N-CLI.
6. The fraud detection system of clause 3, 4 or 5, wherein the call signalling information extraction unit is configured to determine whether or not a geographic origin of the call is the same as a geographic origin of the destination to which the call is forwarded by the call switching unit.
7. The fraud detection system according to any of clauses 3 to 6, wherein the call signalling information comprises multiple data items each depending on an indicated geographic origin and wherein the call information extraction unit is configured to compare the geographic origins indicated by the multiple data items to identify any discrepancies there between.
8. The fraud detection system according to clause 7, wherein the fraud scoring unit is configured to determine a higher fraud score for the incoming call if there are any discrepancies between the geographic origins indicated by the multiple data items.
9. The fraud detection system of any of clauses 1 to 4, further comprising an analysis unit configured to analyse historical call information to determine trend information and wherein the fraud scoring unit is configured to determine the fraud score for the incoming call using the trend information.
10. The fraud detection system of any of clauses 1 to 9, wherein the call switching unit is configured to associate an identifier with the incoming call and is configured to forward the incoming call to the destination associated with the incoming call together with the determined fraud score and the associated identifier.
11. The fraud detection system of any of clauses 1 to 10, comprising a call outcomes database including data for historical calls indicating whether or not the historical calls were fraudulent.
12. The fraud detection system of clause 11, wherein the call signalling information identifies a caller or a group of callers having a common geographic origin.
13. The fraud detection system of any of clauses 1 to 12, wherein the fraud scoring unit comprises one or more of: an expert system, a neural network and a fuzzy logic system.
14. The fraud detection system of any of clauses 1 to 13, wherein the fraud score is forwarded to the associated destination using any one of:

performing a GET request for the fraud score using an Application Program Interface, API;
injecting the fraud score into the extracted call signalling data in a predetermined format and parameter; and
injecting the fraud score as a spoken call whisper to the called party when the call is answered.
15. The fraud score detection system according to any of clauses 1 to 14, wherein the fraud score is forwarded separately from the call.
16. The fraud score detection system according to any of clauses 1 to 15, wherein the fraud score is forwarded in response to a request from a remote server.
17. The fraud score detection system according to any of clauses 1 to 16, wherein the call is forwarded to a first destination associated with the call and the fraud score is forwarded to a second destination associated with the call.
18. A network operator server comprising the fraud detection system of any of clauses 1 to 17.
19. A fraud detection system comprising:
means for receiving an incoming call;
means for processing the incoming call to extract call signalling information associated with the incoming call;
means for determining a fraud score associated with the incoming call using the extracted call signalling information, the fraud score indicating the likelihood that the incoming call is from a fraudulent caller; and
means for forwarding the incoming call to a destination associated with the incoming call together with the fraud score.
20. A fraud detection method comprising:
receiving an incoming call;
processing the incoming call to extract call signalling information associated with the incoming call;
determining a fraud score associated with the incoming call using the extracted call signalling information, the fraud score indicating a likelihood that the incoming call is from a fraudulent caller; and
forwarding the incoming call to a destination associated with the incoming call together with the determined fraud score.
21. The fraud detection method of clause 20, wherein the incoming call has a plurality of associated destinations and the method further comprising selecting one of the associated destinations based on the determined fraud score.
22. The fraud detection method of clause 20 or 21, further comprising processing the extracted call signalling information to determine one or more call trust factors for the incoming call and determining the fraud score for the incoming call using the determined call trust factors for the incoming call.
23. The fraud detection method of clause 22, further comprising determining whether or not the calling party is hiding a presentation CLI, P-CLI.
24. The fraud detection method of clause 22 or 23, further comprising determining whether or not the signalling information of the incoming call comprises a network CLI, N-CLI.
25. The fraud detection method of clause 22, 23 or 24, further comprising determining whether or not a geographic origin of the call is the same as a geographic origin of the destination to which the call is forwarded by the call switching unit.
26. The fraud detection method according to any of clauses 22 to 25, wherein the call signalling information comprises multiple data items each depending on an indicated geographic origin and the method further comprising comparing the geographic origins indicated by the multiple data items to identify any discrepancies therebetween.

27. The fraud detection method according to clause 26, further comprising determining a higher fraud score for the incoming call if there are any discrepancies between the geographic origins indicated by the multiple data items.

28. The fraud detection method of any of clauses 20 to 27, further comprising analysing historical call information to determine trend information and determining the fraud score for the incoming call using the trend information.

29. The fraud detection method of any of clauses 20 to 28, further comprising associating an identifier with the incoming call and forwarding the incoming call to the destination associated with the incoming call together with the determined fraud score and the associated identifier.

30. The fraud detection method of any of clauses 20 to 29, comprising a call outcomes database including data for historical calls indicating whether or not the historical calls were fraudulent.

31. The fraud detection method of clause 30, wherein the call origin signalling information identifies a caller or a group of callers having a common geographic origin.

32. The fraud detection method of any of clauses 20 to 31, wherein the fraud scoring unit comprises one or more of: an expert system, a neural network and a fuzzy logic system.

33. A computer program product comprising computer implemented instructions which, when run on a programmable computer device, cause the programmable computer device to perform the method of any of clauses 20 to 32.

The invention claimed is:

1. A fraud detection system comprising:
a call switching unit for receiving an incoming call at a current time;
a call information extraction unit for processing the incoming call to extract call signal information associated with the incoming call including a phone number of the calling party;
an age determination unit for determining an age of the phone number of the calling party, wherein said age is determined by calculating a difference in time between an approximate time when the phone number was activated by a communication provider and the current time; and
a fraud scoring unit for determining a fraud score associated with the incoming call using the determined age, the fraud score indicating a likelihood that the incoming call is from a fraudulent caller;
wherein the call switching unit is configured to forward the incoming call to one of a plurality of different destinations based on the fraud score determined by the fraud scoring unit or wherein the incoming call has a plurality of associated destinations and wherein the call switching unit is configured to select one of the associated destinations based on the determined fraud score.

2. The fraud detection system of claim 1, wherein the age determination unit is configured to use digits from the extracted phone number of the calling party to look up a database to determine the age of the phone number.

3. The fraud detection system of claim 1, wherein the fraud determining unit is arranged to determine a fraud score indicating a higher likelihood that the incoming call is from a fraudulent caller the younger the determined age of the phone number of the caller.

4. A fraud detection system comprising:
means for receiving an incoming call;
means for processing the incoming call to extract call signal information associated with the incoming call, including a phone number of the calling party;
means for determining an age of the phone number of the calling party, wherein said age is determined by calculating a difference in time between an approximate time when the phone number was activated by a communication provider and the current time; and
means for determining a fraud score associated with the incoming call using the determined age of the phone number, the fraud score indicating the likelihood that the incoming call is from a fraudulent caller; and
means for forwarding the incoming call to one of a plurality of different destinations based on the determined fraud score or means for forwarding the incoming call together with the determined fraud score to a remote destination.

5. The fraud detection system of claim 4, wherein the means for determining the age is configured to use digits from the extracted phone number of the calling party to look up a database to determine the age of the phone number.

6. The fraud detection system of claim 4, wherein the means for determining a fraud score is arranged to determine a fraud score indicating a higher likelihood that the incoming call is from a fraudulent caller the younger the determined age of the phone number of the caller.

7. A fraud detection method comprising:
receiving an incoming call at a current time;
processing the incoming call to extract call signal information associated with the incoming call including a phone number of the calling party;
determining an age of the phone number of the calling party, wherein said age is determined by calculating a difference in time between an approximate time when the phone number was activated by a communication provider and the current time;
determining a fraud score associated with the incoming call using the determined age, the fraud score indicating a likelihood that the incoming call is from a fraudulent caller; and
forwarding the incoming call to one of a plurality of different destinations based on the determined fraud score or means for forwarding the incoming call together with the determined fraud score to a remote destination.

8. A non-transitory computer program product comprising computer implementable instructions which, when run on a programmable computer device, cause the programmable computer device to perform the method of claim 7.

* * * * *